Aug. 25, 1970  J. J. PICKERING  3,525,173
FISHING RIG AND MEANS FOR CASTING SAME
Filed May 3, 1968  3 Sheets-Sheet 1
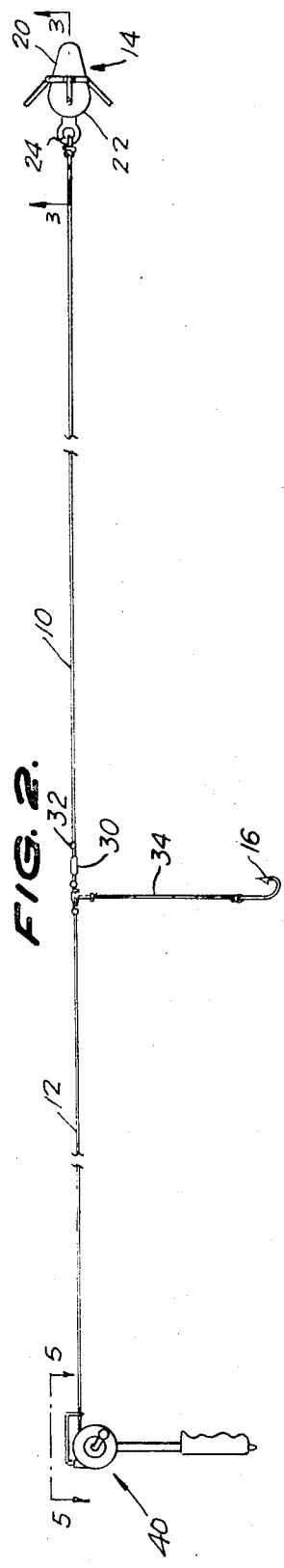
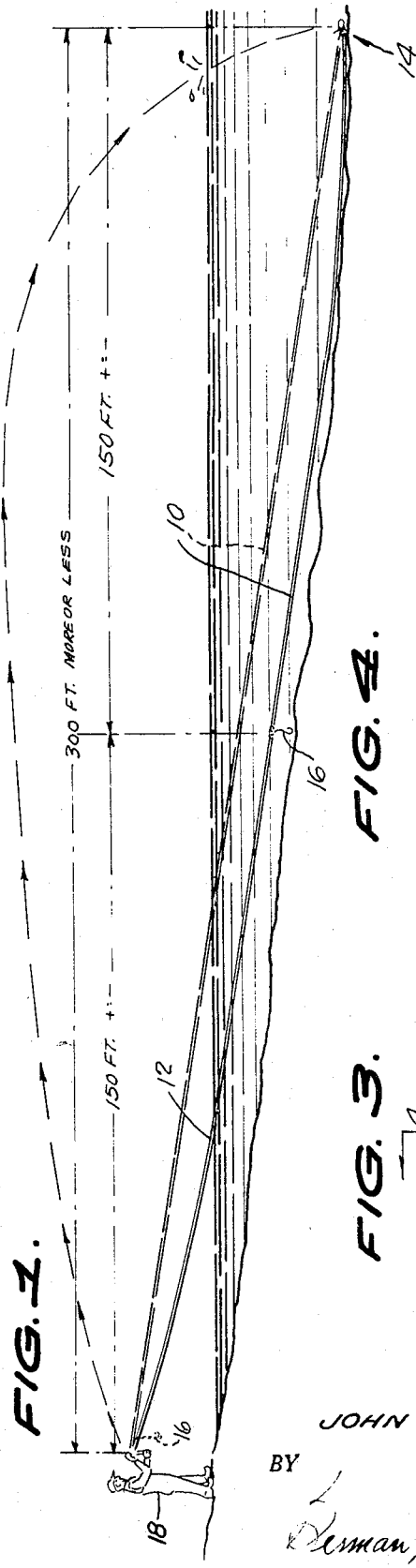
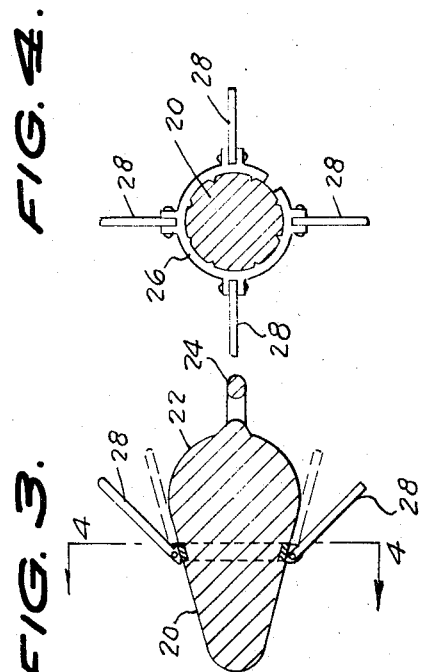
INVENTOR.
JOHN J. PICKERING,
BY
Berman, Davidson & Berman
ATTORNEYS.

Aug. 25, 1970   J. J. PICKERING   3,525,173
FISHING RIG AND MEANS FOR CASTING SAME
Filed May 3, 1968   3 Sheets-Sheet 2
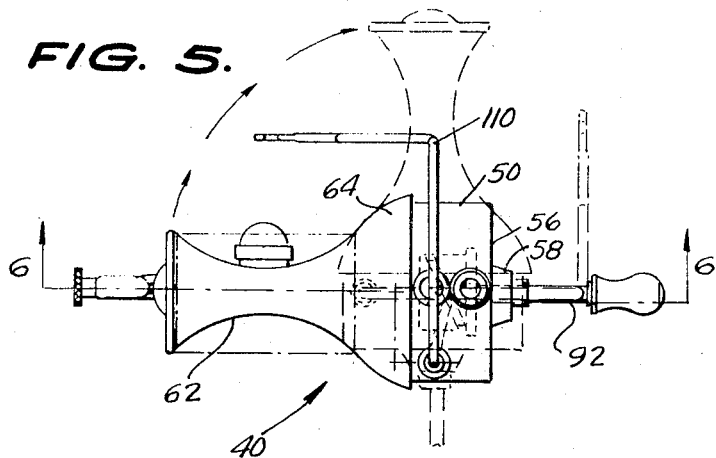
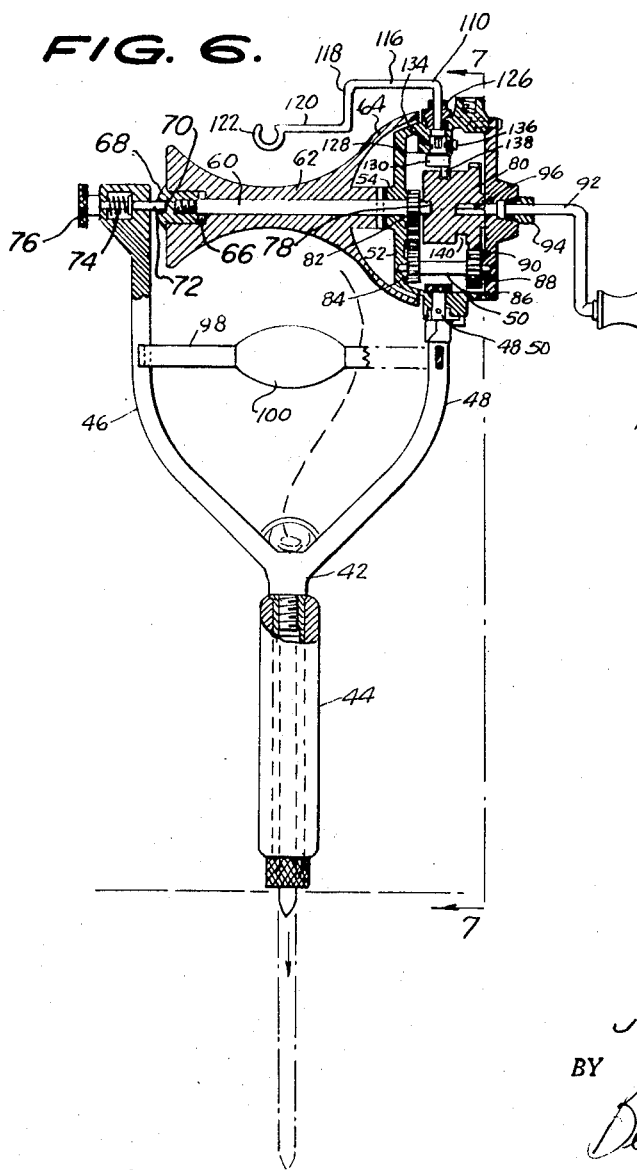
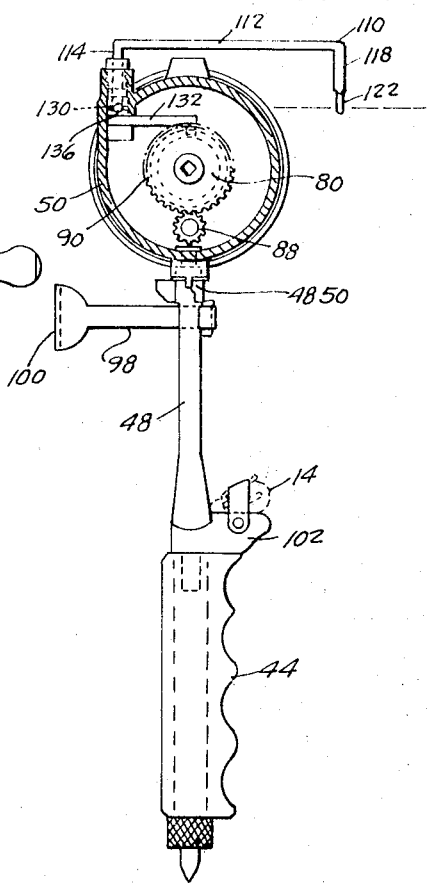
INVENTOR.
JOHN J. PICKERING,
BY
Berman, Davidson & Berman
ATTORNEYS.

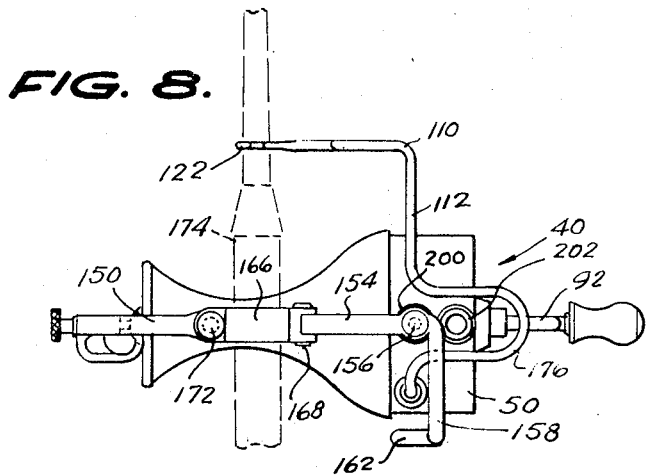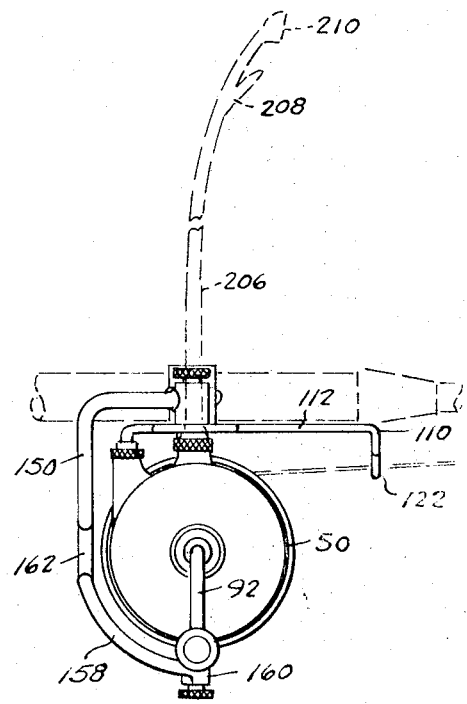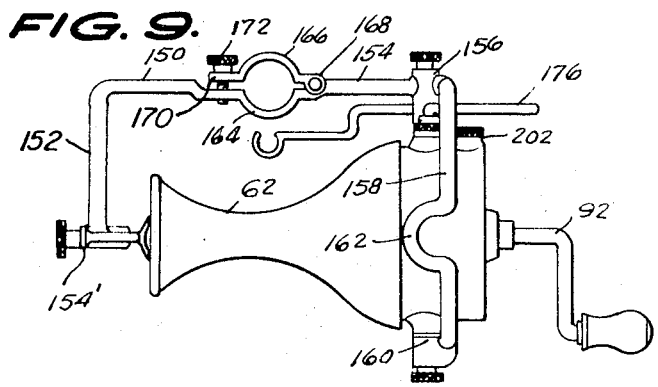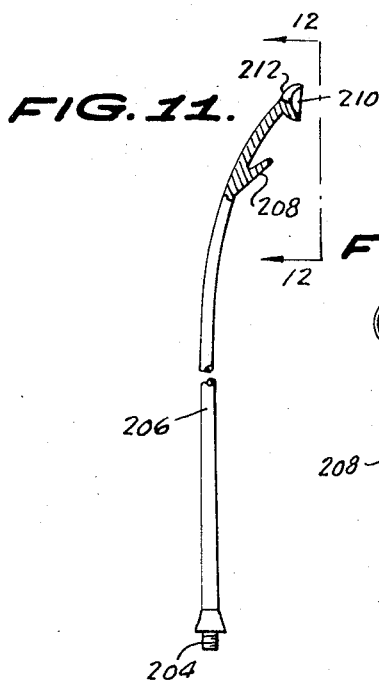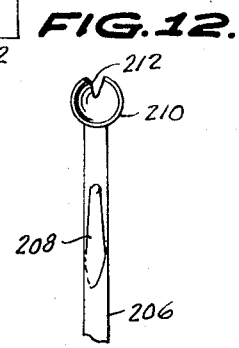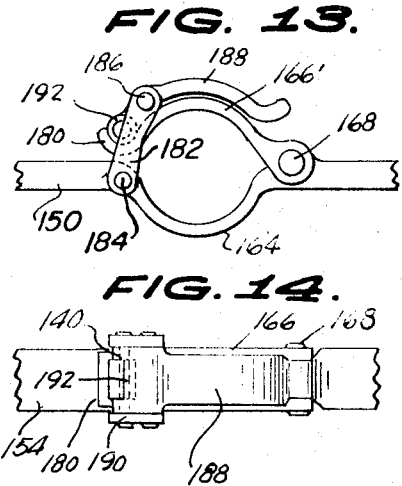

United States Patent Office 3,525,173
Patented Aug. 25, 1970

3,525,173
FISHING RIG AND MEANS FOR CASTING SAME
John J. Pickering, 102 Barrett Ave.,
North Providence, R.I. 02908
Filed May 3, 1968, Ser. No. 726,520
Int. Cl. A01k *91/00, 91/02*
U.S. Cl. 43—19                                        3 Claims

ABSTRACT OF THE DISCLOSURE

A fishing rig comprising: a length of elastic line joined at one end to a length of conventional line. A sinker is secured at the free end of the elastic line. A hook is joined to the conventional line adjacent its juncture with the elastic line. A handle is provided bifurcated at its upper end to provide spaced upstanding legs. A spool has one end pivoted to one of said legs and its other end detachably secured to the other of said legs. Slingshot means are provided between said legs for casting said sinker to draw said rig from said spool.

---

It is an object of this invention to provide a new and useful fishing rig in which one end of a line may be anchored at a desired spot distant from the shore with the hooks placed intermediate the anchorage and the shore line and with ability to draw the hooks to shore to disengage the fish, rebait the hook and return the hook approximately to its original location.

It is a further object of this invention to provide special means for casting such a rig as aforesaid and for utilizing a reel to play in a sizable fish which may be caught on the rig.

It is a further object of this invention to provide, for use in connection with a reel and rig as aforesaid, means for casting the rig out to its desired extent, which means provide a mounting for the reel and mounting for alternate means for actually making the cast.

The above and other objects will be made clear from the following detailed description when taken in connection with the annexed drawings, in which:

FIG. 1 is a perspective elevation showing the rig and associated tackle in use;
FIG. 2 is an enlarged view of the rig itself extended;
FIG. 3 is a section on the line 3—3 of FIG. 2;
FIG. 4 is a section on the line 4—4 of FIG. 3;
FIG. 5 is a plan view taken on the line 5—5 of FIG. 2;
FIG. 6 is a view partly in section taken on the line 6—6 of FIG. 5;
FIG. 7 is a section taken on the line 7—7 of FIG. 6;
FIG. 8 is a view similar to FIG. 5, but showing adaptation of the equipment to a rod;
FIG. 9 is an elevation of FIG. 8;
FIG. 10 is a view similar to FIG. 7, showing the reel attached to a rod as in FIGS. 8 and 9, with an additional fly casting attachment secured to the reel;
FIG. 11 is an elevation partly in section of the fly casting attachment.
FIG. 12 is a view on the line 12—12 of FIG. 11;
FIG. 13 shows a rod holder similar to that of FIGS. 8 and 9, but adapted for quick release; and
FIG. 14 is a plan view of FIG. 13.

Referring now to FIGS. 1–4, the basic rig is shown in use in FIG. 1 and comprises a length of elastic line 10 joined to a length of conventional line 12. The elastic line 10 has at one end a sinker 14 while a conventional hook 16 is attached to the line 12 adjacent its juncture with the line 10. The rig is under control of the fisherman 18 and if a fish bites on the hook 16, the fisherman may draw in the hook 16 by stretching the elastic line 10 against the resistance of the sinker 14. He may then remove the fish, rebait the hook, and the elastic line 10 will restore the hook substantially to the position shown in FIG. 1.

The rig is shown in larger scale and greater detail in FIG. 2. The sinker 14 comprises a conical body portion 20 having a hemispherical end 22 to which is secured an eye 24 with the line 10 conventionally tied to the eye 24.

Referring now to FIGS. 3 and 4, the body 20 is surrounded by a band 26 to which are pivoted arms 28. These are mounted for limited pivotal movement from the dotted line position of FIG. 3 to the full line position. These legs 28 act as anchor flukes and resist pull on the eye 24 by the line 10 and therefore securely anchor the end of the line at the point where the cast leaves it. It will be noted that the ring 26 is only lightly secured to the conical body portion 20 so that if obstacles are encountered in the final retrieval of the rig, the ring 26 and its associated arms 28 will pull free, permitting retrieval of the rig even over a rough river bottom. The cost of the ring 26 and its arms 28 is minimal and, compared to the value of the rig as a whole, these parts are expendable.

The line 12 joins the line 10 by a conventional swivel joint 30 which may include an eye 32 to which the line 12 is attached as well as a leader 34 for spacing the hook 16 away from the juncture.

In FIGS. 1 and 2, the opposite end of the line 12 is shown connected to the reel generally designated 40, but since this reel may take several forms described in detail hereinafter and since the method of casting has practically nothing to do with the efficacy of the rig, consideration of these details will be reserved to later in this application. The reel is not strictly necessary. It could be coiled either as a hand line cast or as a heaving line and the sinker 14, when properly thrown, will carry out first, line 10, and when that line tensions, then line 12 just as efficaciously as it can be projected by any of the various means hereinafter discussed.

Fishing of the type herein contemplated is a sport and a sport is or should be fun. Any devotee of the art of fishing for fun knows that playing a fish in by means of a reel is a great deal more exacting and exciting than pulling in fish on a hand line and to provide an added attraction for the rig just described there has been devised a special reel adaptable to the rig of FIGS. 1 and 2 which will now be described.

Referring now to FIGS. 5, 6 and 7, the reel heretofore generally designated 40 is shown as mounted on a Y-shaped frame 42 having a lower handle portion 44 with upstanding legs 46 and 48. The reel 40 has a frame 50 which is pivotally mounted on the leg 48. The frame 50 has an inner wall 52 in which is formed a hub 54. An outer cover plate 56 is removably secured to the frame 50 and has a hub 58 formed therein. An axle 60 is journaled in the hub 54 and is keyed to a spool 62 which has at one end a partially spherical flange 64 overlying and in running engagement with a portion of the frame 50.

The spool 62 at its opposite end has a recess 66 accommodating a special nut 68 which has threaded engagement with the axle 60. The nut 68 has an aperture 70 receiving a pin 72 mounted in the extremity of the arm 46. A spring 74 biases the pin 72 toward the aperture 66 in the nut 68 and a button 76 connected to the outer end of the pin 72 makes it possible to withdraw the pin 72 from the aperture 70 of the nut 68 to permit the axle 60 and spool 62 to swing to the dotted line position shown in FIG. 5.

The axle 60 has its free end 78 journaled in a member 80 presently to be described and has secured to it adjacent the end wall 52 of the casing 50 a pinion 82 which meshes with an equal pinion 84 secured to a stub shaft 86 which is journaled at one end in the end wall 52 and at its opposite end in the cover plate 56. A smaller pinion 88 is secured to the opposite end to the stub shaft 86 and meshes with gear teeth 90 formed on the outer perimeter of the member 80.

A crank handle 92 is journaled in the boss 58 of the cover plate 56 and is secured against axial shifting by a nut 94. The inner extremity 96 of the crank 92 is squared and engages a squared hole in the member 80. The end 96 is coaxial with the axis 60 and serves as a means for turning the member 80 around the end 78 of the axle 60.

Approximately midway of the height of legs 46 and 48 they are connected by an elastic strap 98 having a central sinker-receiving pocket 100. The sinker 14 normally rests on a boss 102 formed at the top of the handle portion 44 and which is best seen in FIG. 7. When the fisherman is ready to make a cast, he disengages pin 72 from the aperture 70 in the nut 66 and swings the axle 60 and spool 62 to the position shown in dotted lines in FIG. 5. This leaves one end of the spool 62 free and by placing the sinker 14 in the pocket 100 and drawing back on the elastic band 98, the handle 44 and the arms 46 and 48 cooperate as a slingshot to permit projecting the sinker 14 toward the desired spot in the water to be fished. The line 10 followed by the line 12 then comes off the free end of the spool 62 in the manner of a conventional spinning reel, and when the sinker 14 has landed, the spool 62 is then swung back to the full line position of FIGS. 5 and 6, where by camming action, the pin 72 is reengaged in the aperture 70 and the outfit is now in condition to play fish, using the crank 92 through gear 90 and its train to the axle 60 and spool 62.

In practice, it will usually be best not to attach the hook 16 and leader 34 to the line 12 until after the cast is made. Whatever portion of line 12 has been carried out by the cast can be easily rewound in the manner just described until the swivel 32 is avaliable for attachment of the hook and leader. After this, the elastic line 10 will draw the line 12 with the hook and leader out to the desired position in the water.

Level wind means for the spool 62 may be provided by the following mechanism which will be described with reference to FIGS. 5, 6 and 7. A piece of wire or other similar material 110 has a straight horizontal section 112 bent to form a vertical leg 114 and at the other to form a horizontal leg 116. The horizontal leg 116 is bent to form a vertical leg 118 which in turn is bent to form a horizontal leg 120 parallel to the leg 116. A line guiding loop 122 is formed at the free end of the leg 120 and as a study of the dotted line position of the parts in FIG. 5 will show, during the cast or other projection of the sinker 14, the guiding loop 122 lies entirely clear of the line. When the parts are swung to the full line position in FIGS. 5 and 6, the open half of the loop 122 permits ready reengagement of the line with the loop.

The drive for the parts just described is shown in FIGS. 6 and 7 and comprises a stud 126 threaded into the casing 50 and which receives the vertical leg 114.

The drive for the part 110 just described is shown in FIGS. 6 and 7. The vertical leg 114 of the member 110 passes through a stud 126 which is screw-threaded into the casing 50. Adjacent the stud 126 the casing 50 has an internal boss 128 which receives the shank of a stud 130 to which is attached an arm 132. The shank of the stud 130 has a circumferential groove 134 which freely receives the tip of a screw 136 threaded into the boss 128. The lower end of the vertical arm 114 is squared at 138. The square portion 138 fits a mating aperture in the shank of the stud 130. The free end of the arm 132 carries a follower 140 which engages a groove 142 formed in the member 80 and constituting a cylindrical cam. It follows that as the crank 92 is rotated, the member 80 rotates with it and the arm 132 is given a rocking movement which is communicated through member 110 to the line guide 122.

Just as it is more fun to play fish with a reel than to bring it in on a hand line so the fun is increased if a rod is used since this gives the fish a considerable leverage against the fisherman, greatly multiplying the apparent pull of the fish. Indeed, it is said that with the 12-foot salmon rods still used on the Restigouche and the Grand Cascapedia, it is impossible for the fisherman to exert a pull of more than three or four pounds regardless of his personal strength, the leverage twelve feet away being simply too much. In accordance with the slogan that fishing should be fun, provision has been made for the use of a rod in connection with the rig and the reel heretofore discussed and this arrangement is detailed in FIGS. 8–14. If it is desired to use a rod, it will not be desired also to use a sling 98–100. The reel 40, however, is so designed as to be bodily detachable from the handle member 42 by pulling on the pin 72, swinging the reel to the dotted line position of FIG. 5 and detaching the case 50 from the arm 48 at the pivot 4850.

The Y-shaped member 42 is then replaced by a special rod holding member 150, shown in plan in FIG. 8 in rear elevation in FIG. 9, and in end elevation in FIG. 10. The member 150 has a vertical leg 152 at the end of which is mounted a spring and pin assembly 154' which is made up of elements corresponding to elements 72, 74 and 76, seen in FIG. 6, and which engages the end of the spool 62. The member 150 has a cross arm 154 terminating in a boss 156 to which is secured an arcuate arm 158 which terminates in a boss 160. The upper boss 156 and the lower boss 160 constitute pivots for the reel 40 permitting it to be swung relative to the member 150 to the same position shown in solid and dotted lines in FIG. 5 as the reel there occupied relative to the handle 42.

A loop 162 is formed in the arcuate arm 158 to accommodate the handle 92 when the reel is swung about the pivots in bosses 156 and 160.

The horizontal arm 154 has formed in it a rod accommodating loop 164, best seen in FIG. 9, and an arm 166 is pivoted to the horizontal arm 154 at 168 with its free end 170 secured to the arm 154 by a knurl-headed bolt 172. When secured, as shown in FIG. 9, the butt of the rod 174 is securely clamped with pivotal relationship to the reel 40. The level wind member 110 is mounted and operated in precisely the same way but the horizontal line 112 has formed therein a loop 176 which enables the member 110 to function as a level wind device with clearance around the boss 156.

FIGS. 13 and 14 illustrate a variation in the design of the horizontal arm 154 and the rod holding loop 164, in which a top member 166' is pivoted to the arm 154 at 168. In this case, however, the free end of the upper loop 166' terminates in a hook 180. A pair of links 182 are pivoted at 184 to the arm 154 and at their opposite ends are pivoted as at 186 to a locking bell crank 188. The opposite end of the bell crank 188 is forked to provide ears 190 between which are pivoted a roller 192 which engages the hook 180 to provide a familiar type of quick release clamp.

Occasionally, it may be desired to utilize such light lures as nymphs or streamer flies. In this case, the alternative illustrated in FIGS. 10 and 11 is employed. It is noted that the reel casing 50 is formed with adjacent bosses 200 and 202 in its upper surface. The boss 200, as shown in FIG. 9, is used for making a swivel connection to the boss 156 which forms a part of the member 150. The other boss is used to receive the screw-threaded end 204 of a whiplash member 206 which may be of any desired length. At its upper end the member 206 is formed with a hook-like member 208 and at its tip with a pocket 210. In use, with the reel 40 turned to the dotted line position of FIG. 5, that is, casting position, a portion of the line is withdrawn to be supported by the hook 208 and at the extremity of the line is put a light sinker of the split shot type to rest in the pocket 210. The member 206 is then bent and released to catapult the sinker out of pocket 210 and the sinker carries with it the line out of the hook 208, casting it as much as fifty feet which is an excellent distance for fly casting.

In these days of low cost glass rods, it will be clearly apparent that the reel 40 is the most expensive item making up a complete set which would include the handle 42, a rod 174 and the member 150 which can be adapted either to the use of FIGS. 5, 6 and 7, or to the use of FIGS. 8, 9 and 10. It is important, therefore, that this reel be standardized so that the same reel can be used in coaction with various members of the complete set of instrumentalities. This, as above noted, has been achieved. The result is a fishing "set" of extraordinary versatility ranging from simple hand line operations to the novel slingshot casting arrangement to a rod and spinning reel combination and finally to a combination of fly casting with spinning reel retrieval.

While certain specific details of construction have been illustrated and described in connection with this application, various mechanical changes doubtless will occur to those skilled in the art. It is not intended, therefore, to limit this invention to the precise details disclosed but only as set forth in the subjoined claims.

What is claimed is:

1. A fishing rig comprising: a length of elastic line joined at one end to a length of conventional line; a sinker at the free end of said elastic line and at least one hook joined to said conventional line adjacent its juncture with said elastic line and means for casting said sinker and lines including a handle bifurcated to provide spaced upstanding legs; a spool having one end pivoted to one of said legs and its other end detachably secured to the other of said legs and slingshot means between said legs for casting said sinker to draw said rig from said spool.

2. Means as set forth in claim 1, including a handle for rotating said spool to reel in the line, and level wind means for guiding the line on the spool.

3. A casting device comprising: a handle, bifurcated to provide spaced, upstanding legs; a spool having one end pivoted to one of said legs and its other end detachably secured to the other of said legs; a fishing rig wound on said spool, said rig comprising a length of conventional line wound first on said spool, a length of elastic line joined to said conventional line and also wound on said spool, at least one hook secured to said conventional line near its juncture with said elastic line, a sinker attached to the free end of said elastic line; and means mounted adjacent said legs for casting said sinker to draw said rig from said spool.

References Cited

UNITED STATES PATENTS

| | | | |
|---|---|---|---|
| 1,810,565 | 6/1931 | Kenely | 43—44.96 |
| 2,218,946 | 10/1940 | Barnett | 43—42.72 |
| 2,267,285 | 12/1941 | McCrave | 43—42.72 |
| 2,381,089 | 8/1945 | Tweit | 43—19 |
| 2,808,043 | 10/1957 | Lombard | 43—19 |

WARNER H. CAMP, Primary Examiner

U.S. Cl. X.R.

43—42.72, 44.96, 44.98